(12) United States Patent
Nelson et al.

(10) Patent No.: US 8,807,898 B2
(45) Date of Patent: Aug. 19, 2014

(54) CONNECTOR DEVICES AND CONNECTOR ASSEMBLIES

(75) Inventors: Westin Nelson, Dayton, MN (US); Douglas John Martell, White Bear Township, MN (US)

(73) Assignee: Brunswick Corporation, Lake Forest, IL (US)

( * ) Notice: Subject to any disclaimer, the term of this patent is extended or adjusted under 35 U.S.C. 154(b) by 141 days.

(21) Appl. No.: 13/563,862

(22) Filed: Aug. 1, 2012

(65) Prior Publication Data

US 2013/0177368 A1 Jul. 11, 2013

Related U.S. Application Data

(60) Provisional application No. 61/583,398, filed on Jan. 5, 2012.

(51) Int. Cl.
*F16B 37/02* (2006.01)

(52) U.S. Cl.
USPC .......................................... 411/172; 411/174

(58) Field of Classification Search
USPC .............. 411/366.1, 116, 134, 142, 166, 169, 411/172, 174, 175
See application file for complete search history.

(56) References Cited

U.S. PATENT DOCUMENTS

| | | | | |
|---|---|---|---|---|
| 2,315,359 A | * | 3/1943 | Tinnerman | 248/71 |
| 2,346,712 A | * | 4/1944 | Tinnerman | 248/71 |
| 5,000,634 A | | 3/1991 | Ducote | |
| 5,176,482 A | * | 1/1993 | Reinl | 411/170 |
| 5,645,384 A | * | 7/1997 | Wright et al. | 411/174 |
| 5,678,939 A | * | 10/1997 | Ross | 401/6 |
| 7,608,022 B2 | * | 10/2009 | Lull et al. | 482/100 |
| 7,892,155 B2 | * | 2/2011 | Pearson et al. | 482/121 |
| 2004/0096290 A1 | * | 5/2004 | Birnbaum | 411/172 |
| 2007/0054785 A1 | | 3/2007 | Drechsler | |
| 2011/0296773 A1 | | 12/2011 | Kellerman | |

FOREIGN PATENT DOCUMENTS

DE 101 39 023 C1 4/2003

OTHER PUBLICATIONS

International Search Report and Written Opinion for corresponding International Patent Application No. PCT/US2012/072157, having a mailing date of Mar. 13, 2013.

* cited by examiner

Primary Examiner — Gary Estremsky
(74) Attorney, Agent, or Firm — Andrus Intellectual Property Law, LLP (57) ABSTRACT

A connector assembly comprises a base part that defines a through-hole for receiving a bolt and also defines an aperture for receiving a device having a first end that fits through the aperture in the base part and a second end that does not fit through the aperture in the base part. The first end of the device defines a bolt-hole for engaging with a bolt extending though the through-hole in the base part. The second end of the device comprises opposing outer surfaces that engage the base part and thereby prevent the device from passing completely through the aperture, and also align the bolt-hole in the device with the through-hole in the base part when the first end of the device is inserted into the aperture.

23 Claims, 7 Drawing Sheets

CONNECTOR DEVICES AND CONNECTOR ASSEMBLIES

CROSS-REFERENCE TO RELATED APPLICATION

The present utility application claims the benefit of and priority to U.S. Provisional Patent Application No. 61/583,398, filed Jan. 5, 2012, which is incorporated herein by reference in entirety.

FIELD AND BACKGROUND

The present disclosure relates to connector devices and assemblies. The illustrated embodiments relate to exercise equipment and connector devices and assemblies for connecting components of exercise equipment. This disclosure is applicable to other types of apparatus in addition to exercise equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some examples connector assemblies comprise a base part that defines a through-hole for receiving a bolt and also defines an aperture for receiving a device having a first end that fits through the aperture in the base part and a second end that does not fit through the aperture in the base part. The first end of the device defines a bolt-hole for engaging with a bolt extending though the through-hole in the base part. The second end of the device comprises opposing outer surfaces that engage the base part and thereby prevent the device from passing completely through the aperture. The opposing outer surfaces are also configured to facilitate alignment of the bolt-hole in the device with the through-hole in the base part when the first end of the device is inserted into the aperture.

In other examples connector devices are for connecting an element to a base part via a bolt. The devices can comprise a body extending in a longitudinal direction between first and second ends, in a lateral direction that is perpendicular to the longitudinal direction between first and second outer surfaces, and in a transverse direction that is perpendicular to the longitudinal direction and perpendicular to the transverse direction between first and second side surfaces. The body has a bolt-hole extending into the first outer surface in the lateral direction for receiving and engaging with the bolt. The first and second outer surfaces each has a face for engaging with the base part when the device is inserted in an aperture in the base part. At least one of the faces on the first and second outer surfaces is angled with respect to the longitudinal direction to thereby engage with the base part and cause the device to orient with respect to the base part so that the bolt-hole aligns with a through-hole in the base part.

BRIEF DESCRIPTION OF THE DRAWINGS

Examples of connector devices and assemblies are described with reference to the following figures. The same numbers are used throughout the figures to reference like features and components.

DETAILED DESCRIPTION OF THE DRAWINGS

In the present description, certain terms have been used for brevity, clearness and understanding. No unnecessary limitations are to be inferred therefrom beyond the requirement of the prior art because such terms are used for descriptive purposes only and are intended to be broadly construed. The different devices and assemblies described herein may be used alone or in combination with other devices and/or assemblies. Various equivalents, alternatives, and modifications are possible within the scope of the appended claims.

Unless otherwise noted, the terms used herein are to be understood according to conventional usage by those of ordinary skill in the relevant art. In addition to the definitions of terms provided below, it is to be understood that as used in the specification, embodiments, and in the claims, "a", "an", or "the" can mean one or more, depending upon the context in which it is used. For example, "an element" should be interpreted to mean "one or more elements," depending upon the context in which it is used.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term, unless defined as otherwise herein.

As used herein, the terms "include" and "including" have the same meaning as the terms "comprise" and "comprising." These terms should be interpreted to be "open-ended" unless otherwise specified. The terms "consisting of" or "consisting essentially of" should be interpreted to be "closed-ended" unless otherwise specified.

Figure 1:
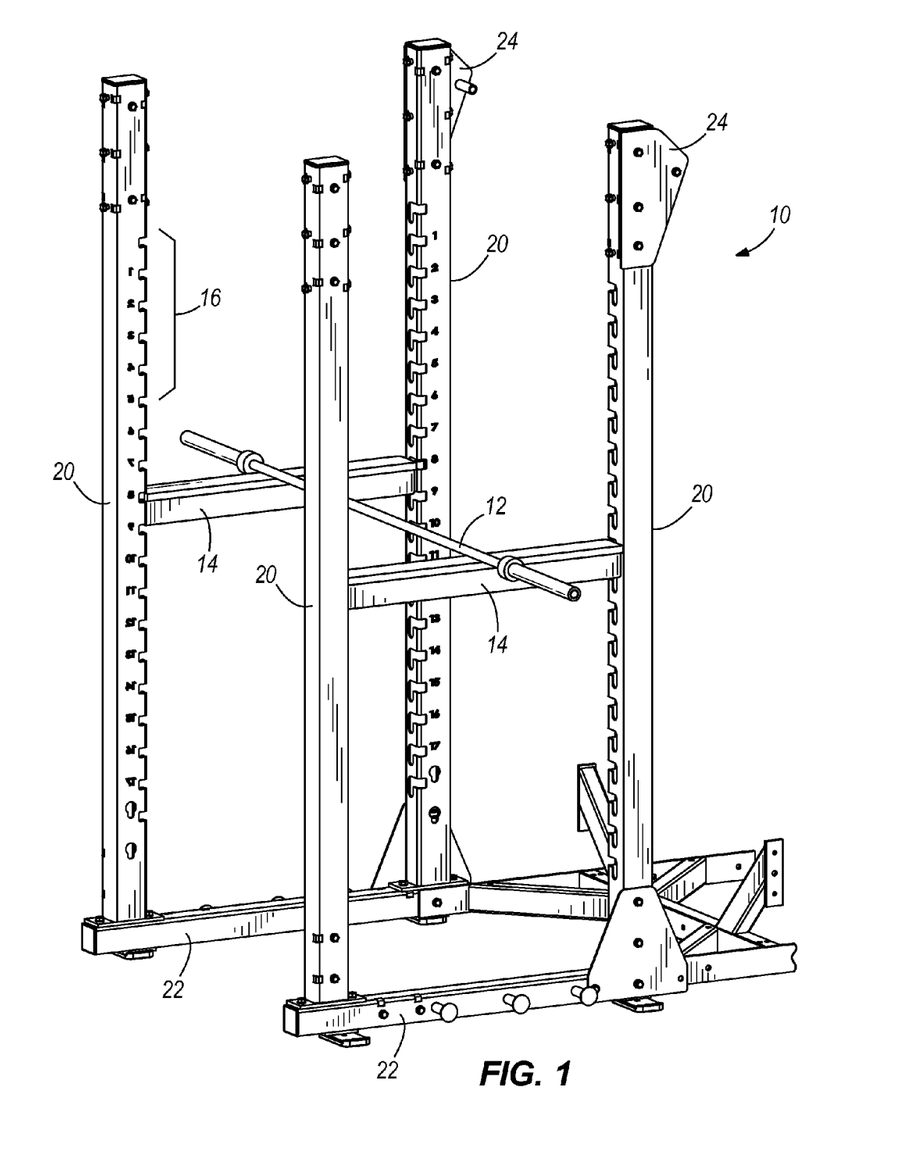
FIG. 1 is a perspective view of exercise equipment having a connector assembly according to the present disclosure.

FIG. 1 depicts exercise equipment including among other things a weight rack 10 and weight bar 12. The weight rack 10 and weight bar 12 are exemplary and provide only one of many examples of uses for the present invention. The present invention is applicable to other apparatuses and/or structural assemblies in addition to the weight rack 10 shown in FIG. 1. The weight bar 12 is supported on the weight rack 10 via a pair of cross support members 14 which are releasably fixable to the weight rack 10 at different vertical locations (e.g. 16) to thereby allow a user to select the vertical height at which the weight bar 12 is supported above the ground. The cross support members 14 are attached to support columns 20, which vertically extend above and are supported by base frame members 22. Auxiliary equipment support members 24 are attached to support columns 20 for attachment of additional exercise equipment apparatus (not shown) such as for example chin-up assemblies. Again, the weight rack 10 shown in the figures is exemplary and the present invention can be used to connect structural members in other types of structural apparatus besides the exercise equipment shown in FIG. 1.

In the example shown, the various structural members of the weight rack 10, including the support columns 20, base frame members 22 and auxiliary equipment support members 24 can be connected together by, among other things, connector assemblies according to the present disclosure.

Figure 2:
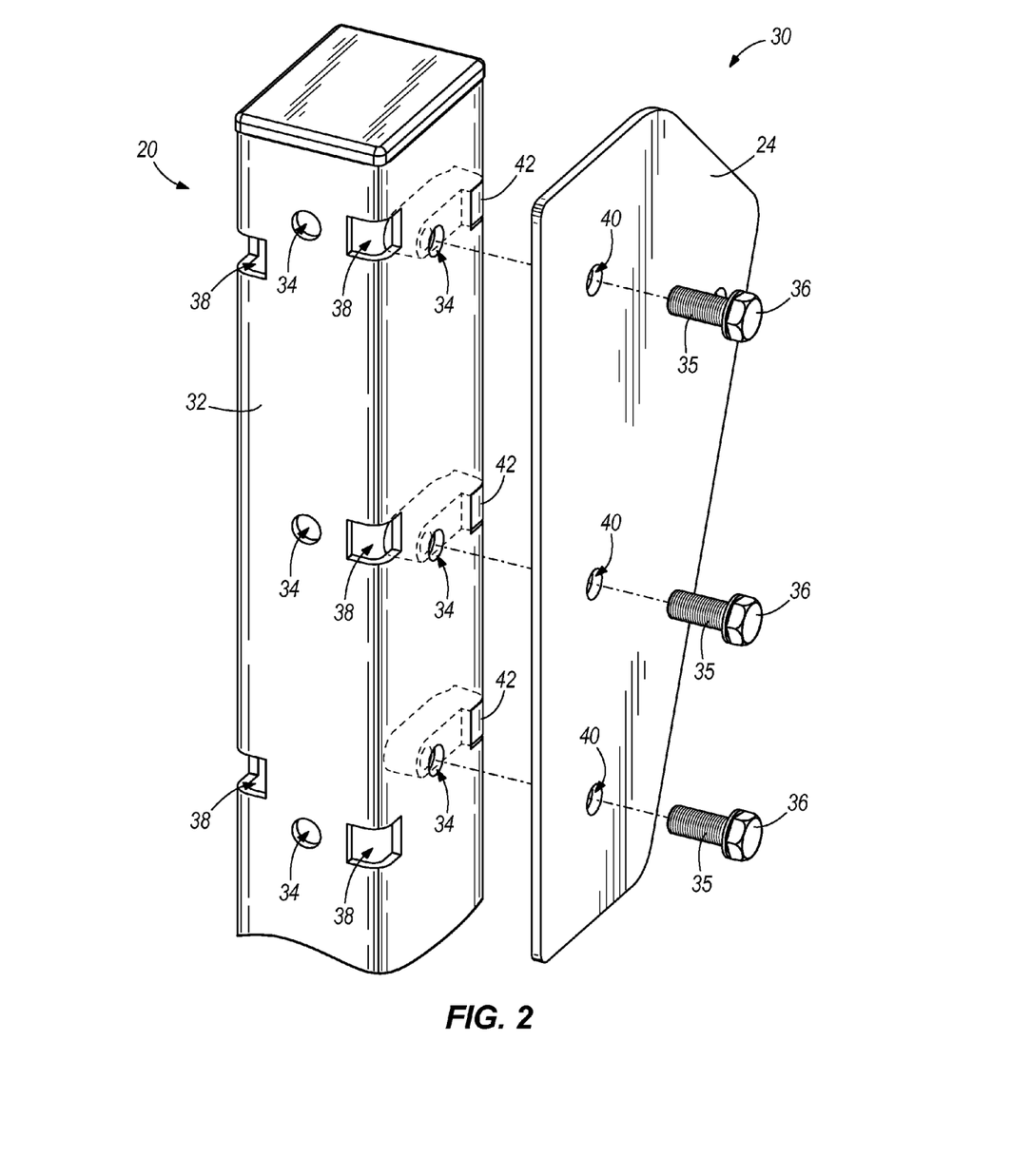
FIG. 2 is a partially exploded view of the connector assembly.
Figure 3:
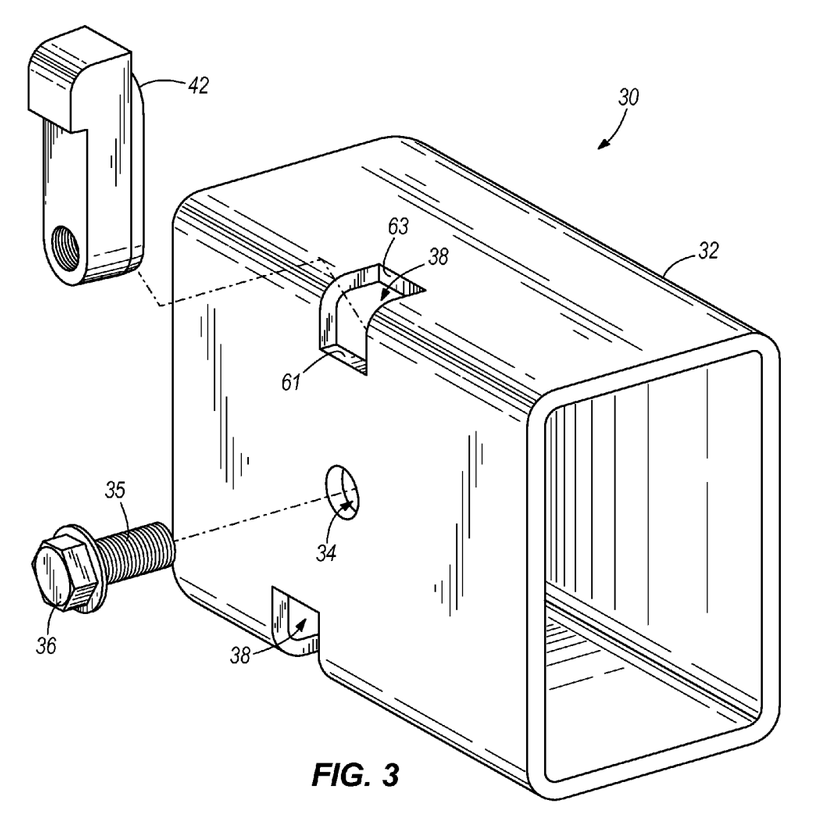
FIG. 3 is another exploded view of the connector assembly.
Figures 4, 5:
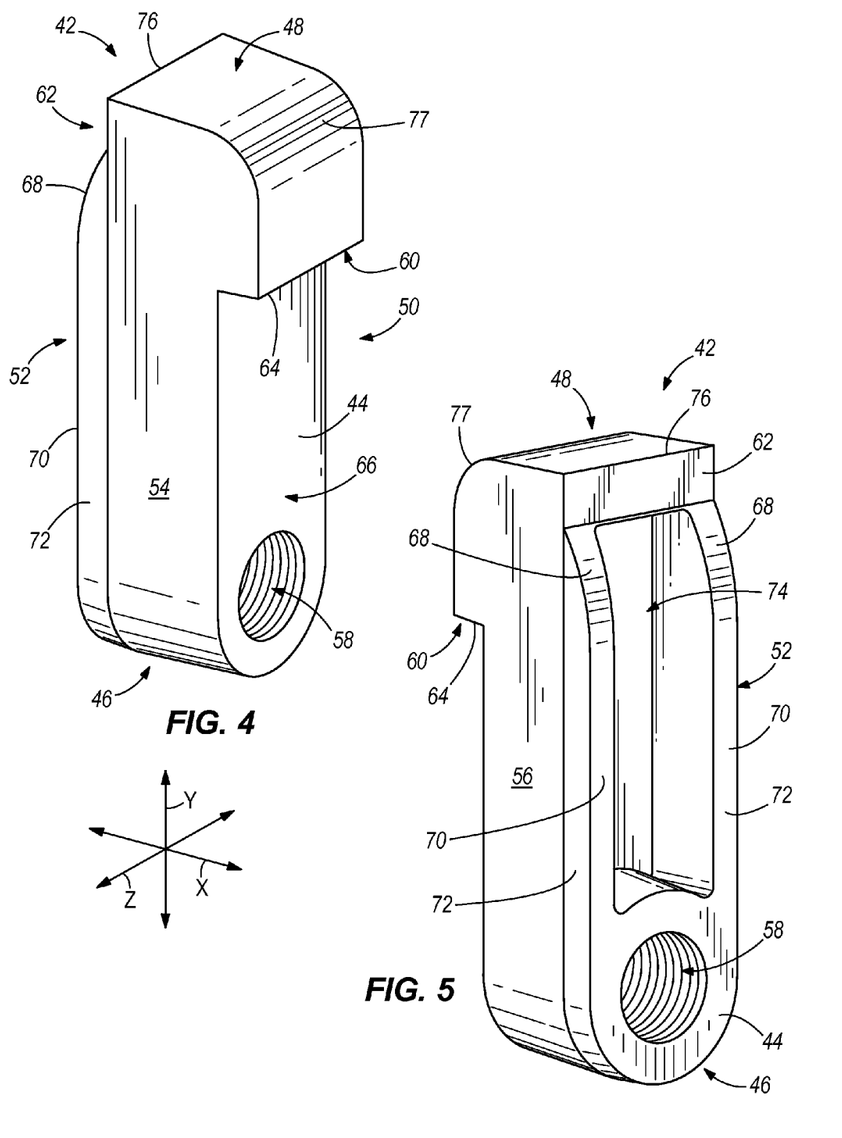
FIG. 4 is a front perspective view of a device for connecting an element to a base part via a bolt.
FIG. 5 is a rear perspective view of the device shown in FIG. 4.
Figure 6:
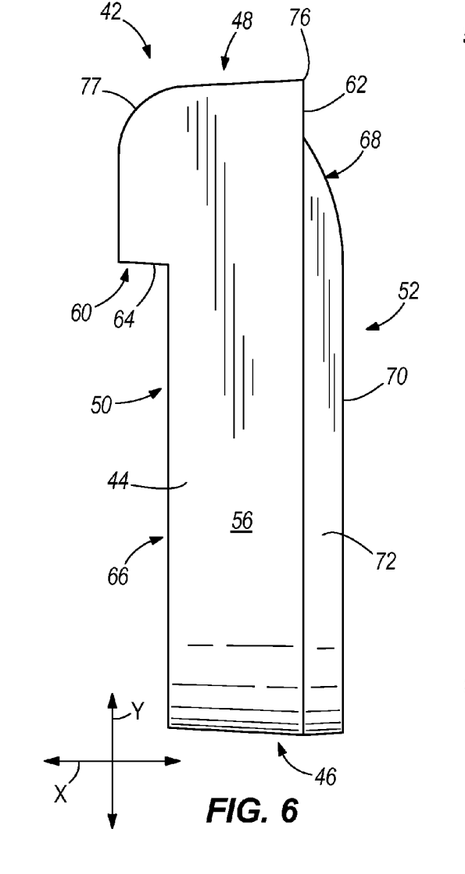
FIG. 6 is a side view of the device shown in FIG. 4.
Figure 7:
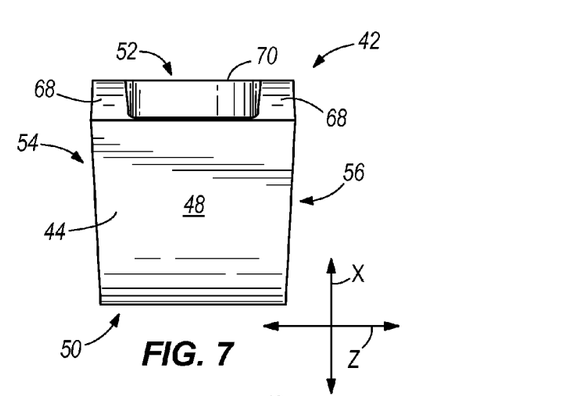
FIG. 7 is a top view of the device shown in FIG. 4.
Figure 8:
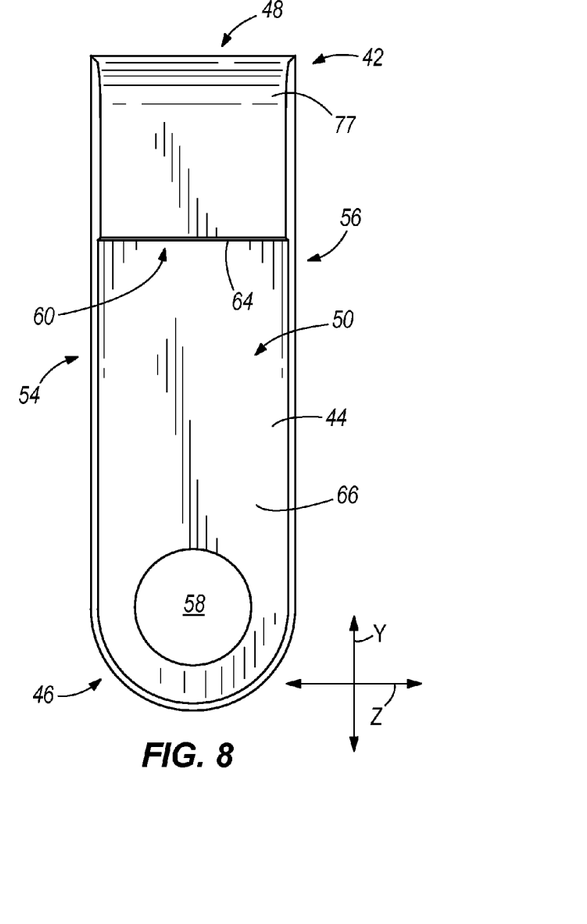
FIG. 8 is a front view of the device shown in FIG. 4.

FIGS. 2 and 3 depict the connector assembly 30, which includes a base part 32, which in the example shown is a rectangular tube that is part of the noted support columns 20 shown in FIG. 1. In this example, the assembly 30 connects the support column 20 and auxiliary equipment member 24. The configuration and function of the base part 32 and member 24 can vary. In other examples, the base part 32 can form part of the base frame member 22 or other portion of the weight rack 10. The base part 32 defines at least one through hole 34 for receiving a bolt 36. The bolt 36 extends through a through hole 40 in the member 24 and then through the through hole 34 in the base part 32 for connecting the member 24 to the base part 32 in a fixed connection. At least one corner of the base part 32 also defines one or more apertures 38. The aperture 38 does not necessarily have to be located at the corner of base part 32. According to the present disclosure, a device 42 is provided for insertion into the aperture 38 and for receiving the threaded end 35 of the bolt 36 and securing the bolt 36 with respect to the base part 32 to thereby connect the base part 32 and member 24.

FIGS. 4-8 depict the device 42 in more detail. The device 42 has a body 44 that extends between a first end 46 and a second end 48 in a longitudinal direction Y, between a first outer surface 50 and a second outer surface 52, in a lateral direction X that is perpendicular to the longitudinal direction Y and between a first side surface 54 and a second side surface 56, in a transverse direction Z that is perpendicular to the longitudinal direction Y and perpendicular to the lateral direction X. The body 44 has a threaded bolt hole 58 extending into the first outer surface 50 in the lateral direction X. The bolt hole 58 is for receiving and engaging with the threaded end 35 of bolt 36, as discussed herein above regarding FIGS. 2 and 3.

As will be described further herein below with reference to FIGS. 9-11, the first end 46 of the device 42 is sized and shaped to fit through the noted aperture 38 in the base part 32. The second end 48 of the device 42 is sized and shaped so that it does not fit through the aperture 38 in the base part 32. In this example, the first outer surface 50 has a face 60 for engaging with the base part 32 when the device 42 is inserted in the aperture 38 in the base part 32. Similarly, the second outer face 52 has a face 62 for engaging with the base part 32 when the device 42 is inserted in the aperture 38 in the base part 32. In this example, the face 60 on the first outer surface 50 is angled with respect to the longitudinal direction Y so as to engage with the base part 32 and cause the device 42 to orient with respect to the base part 32 as the device 42 is inserted into the aperture 38 so that the bolt hole 58 aligns with the through hole 34 on the base part 32, as will be described with reference to FIGS. 9 and 10 herein below. The second end 48 of the device 42 has the opposing outer faces or surfaces (i.e. 60, 62) that engage transversely oriented radial surfaces 61, 63 on the base part 32, respectively, (see FIG. 3) and thereby prevent the device 42 from passing completely through the aperture 38 in the base part 32, and also align the bolt hole 58 in the device 42 with the through hole 34 in the base part 32 when the first end 46 of the device 42 is inserted into the aperture 38.

With continued reference to FIGS. 4-8, the noted face 60 on the first outer surface 50 includes an outwardly protruding step 64, which in this example extends parallel to the lateral direction X and parallel to the transverse direction Z. The outwardly protruding step 64 is sized and shaped to engage with the noted radial surface 61 on the base part 32 so as to cause the first end 46 of the device 42 to rotate (see arrow 80 in FIG. 10) and cause the bolt hole 58 in the device 42 to align with the through hole 34 in the base part 32 as the first end 46 of the device 42 is inserted into the aperture 38 on the base part 32, as will be described further with reference to FIGS. 9 and 10 herein below. The first outer surface 50 also includes a planar surface 66 located beneath the step 64 in the longitudinal direction Y and extending parallel to the longitudinal direction Y.

The noted second outer surface 52 generally extends parallel to the longitudinal direction Y. The second side surface 56 also has an inwardly curved portion 68 located below the face 62 on the second outer surface 52 with respect to the longitudinal direction Y. In addition, the second outer surface 52 includes a planar surface 70 extending in the longitudinal direction. The curved portion 68 is located between the planar surface 70 on the second outer surface 52 and the face 62 on the second outer surface 52 with respect to the longitudinal direction Y. The curved portion 68 uniformly transitions from the planar surface 70 to the face 62 on the second outer surface 52. In this example, the planar surface 70 is defined by a pair of ribs 72 that are spaced apart in the transverse direction Z. A recess 74 is defined between the ribs 72.

The second end 48 of the body 44 has an angled edge 76 that merges with the second outer surface 52 and a curved edge 77 that merges with the first outer surface 50. The first end 46 of the body 44 is radially curved in the lateral direction X.

Figures 9, 10:
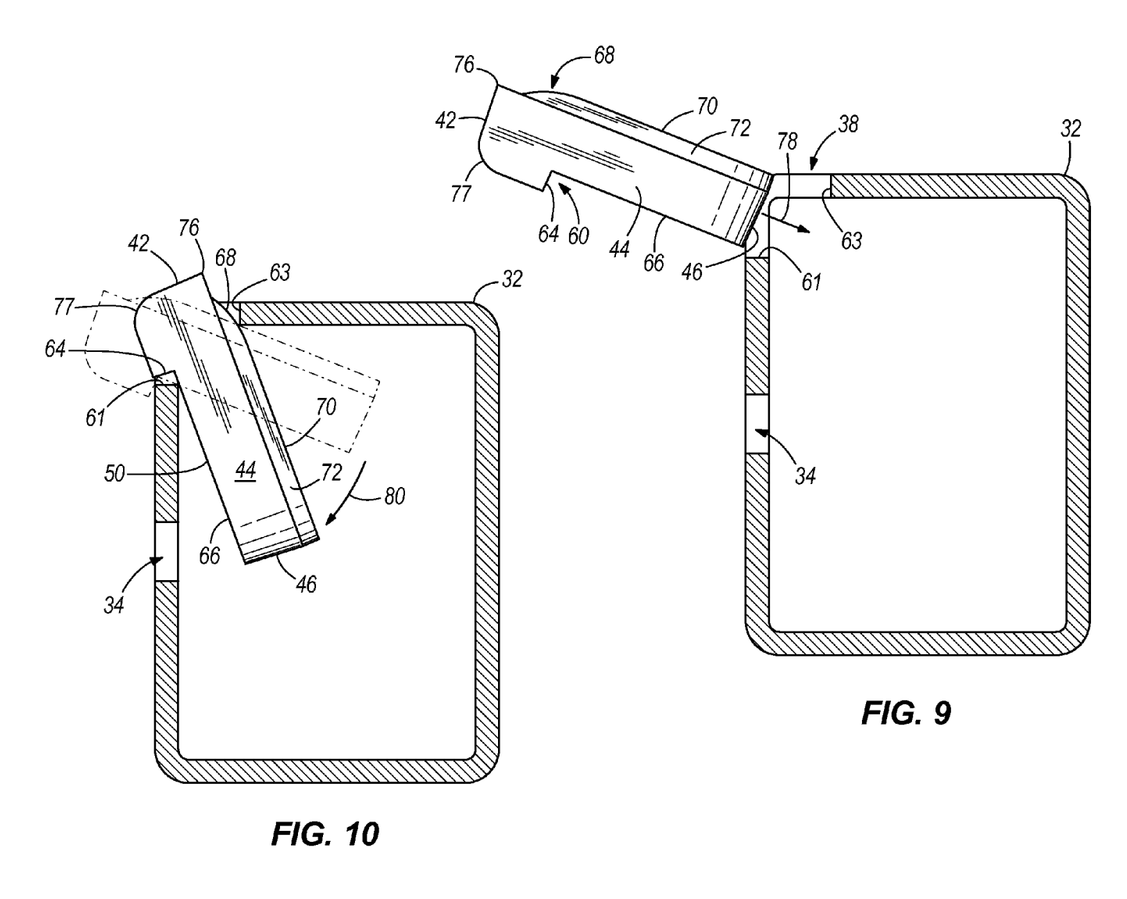
FIG. 9 is a sectional view showing insertion of the device into the base part.
FIG. 10 is a side sectional view showing further insertion and orientation of the device in the base part.
Figure 11:
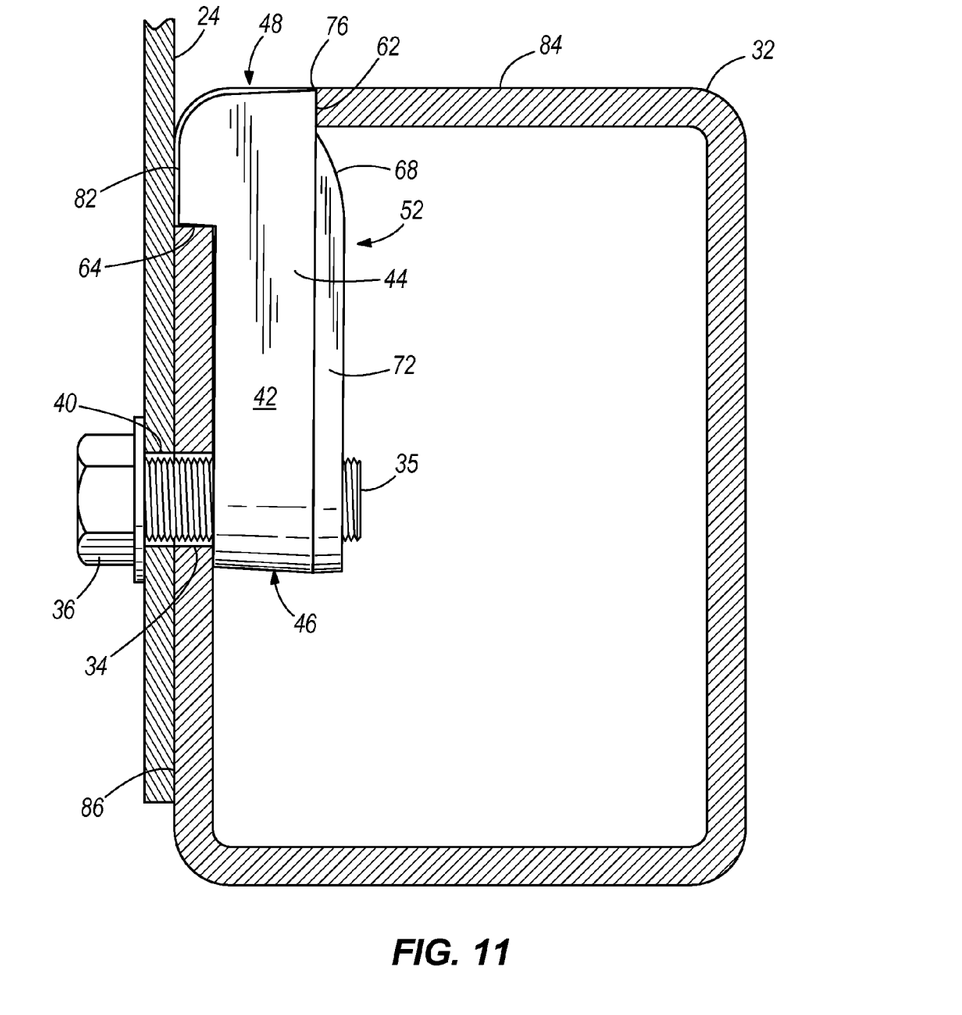
FIG. 11 is a side section view of the connector assembly.

Referring to FIGS. 9-11, the first end 46 of the device 42 is inserted into the aperture 38 in the base part 32, as shown at arrow 78 in FIG. 9. As the body 44 of the device 42 is fed into the aperture 38, the face 60 including step 64 engages the radial surface 61 on the base part 32 and causes the device 42 to rotate, as shown at arrow 80 in FIG. 10, until the bolt hole 58 in the first outer surface 50 is aligned with the through hole 34 in the base part 32, as shown in FIG. 11. Thereafter, as shown in FIG. 11, the bolt 36 is fed through the through hole 40 in the member 24 and the through hole 34 in the base part 32 and engaged in a threaded connection with the bolt hole 58 in the body 44 of device 42. During insertion of the body 44 into the aperture 38, the ribs 72 and noted curved portion 68 thereof and the face 62, due to the spaced apart relation with the first outer surface 50 and noted step 64 prevent passage of the second end 48 through the aperture 38. As shown in FIG. 11, the outer surfaces of the device 42 at the second end 48 are flush with the outer surface 84 and outer surface 86 of the base part 32. The member 24 overlaps the device 42 at location 82.

As will be recognized by those having ordinary skill in the art, the present disclosure thus provides a connector assembly that can be easily mass produced and eliminates the need for tools to hold the device in place. The device can thus be easily replaced in the field if it becomes lost or damaged and is easy to manufacture, thus lessening cost. The examples provided herein advantageously provide modular attachments that are independent of each other and provide a replaceable threaded connection, eliminating the need to replace an entire structural component when the threaded connection breaks down. The device is self-fixturing and self-aligning inside of the base member, thus providing efficiency and ease of use.

Although only a few examples have been described in detail above, those having ordinary skill in the art will readily appreciate that many modifications are possible in the examples without materially departing from the invention. All such modifications are intended to be included within the scope of this disclosure as defined in the following claims. In the claims, means plus function clauses are intended to cover the structures described herein as performing the recited function and not only structural equivalents but also equivalent structures. It is the express intention of the Applicant not to invoke 35 U.S.C. §112, paragraph 6, for any limitations of any of the claims herein, except for those in which the claim expressly uses the words "means for" together with an associated function.

What is claimed is:

1. A connector assembly comprising:
    a device; and
    a base part that defines a through-hole for receiving a bolt and that also defines an aperture for receiving the device;
    the device having a first end that fits through the aperture in the base part and a second end that does not fit through the aperture in the base part;
    wherein the first end of the device defines a bolt-hole for engaging with a bolt extending though the through-hole in the base part;
    wherein the second end of the device comprises opposing outer surfaces that engage the base part and prevent the device from passing completely through the aperture, wherein the opposing outer surfaces are further configured to align the bolt-hole in the device with the through-hole in the base part when the first end of the device is inserted into the aperture; and
    wherein the device has an outer surface that rests flush with an outer surface of the base part when the bolt-hole in the device is aligned with the through-hole in the base part.

2. A connector assembly comprising:
    a device; and
    a base part that defines a through-hole for receiving a bolt and that also defines an aperture for receiving the device;
    the device having a first end that fits through the aperture in the base part and a second end that does not fit through the aperture in the base part;
    wherein the first end of the device defines a bolt-hole for engaging with a bolt extending though the through-hole in the base part;
    wherein the second end of the device comprises opposing outer surfaces that engage the base part and prevent the device from passing completely through the aperture, wherein the opposing outer surfaces are further configured to align the bolt-hole in the device with the through-hole in the base part when the first end of the device is inserted into the aperture; and
    wherein the base part and element are part of an exercise apparatus.

3. A connector assembly according to claim 2, wherein the outer surfaces of the device comprise a first outer surface engaging with the base part on one side of the aperture and a second outer surface engaging with the base part on another, opposite side of the aperture.

4. A connector assembly according to claim 3, wherein the first outer surface of the device comprises a first face engaging with the base part and wherein the second outer surface comprises a second face engaging with the base part, wherein the first and second faces are spaced apart from each other so as to prevent the second end of the device from passing completely though the aperture.

5. A connector assembly according to claim 4, wherein the first face of the device and second face of the device engage radial surfaces of the base part on opposite sides of the aperture in the base part.

6. A connector assembly according to claim 5, wherein the radial surfaces of the base part are at an angle to each other.

7. A connector assembly according to claim 4, wherein the first face comprises an outwardly protruding step that is at an angle to the second face and shaped so as to engage with a first one of the radial surfaces on the aperture and thereby cause the bolt-hole in the first end of the device to align with the through-hole on the base part as the first end of the device is inserted into the aperture on the base part.

8. A connector assembly according to claim 7, wherein the second outer surface comprises an outwardly curved portion for preventing the device from passing completely through the aperture.

9. A connector assembly according to claim 2, wherein the bolt extends through a bolt-hole in an element and through the bolt-hole in the base part to connect the element with the base part.

10. A connector assembly according to claim 9, wherein the element is adjacent to and overlaps the device.

11. A connector device for connecting an element to a base part via a bolt, the device comprising:
    a body extending
        between first and second ends in a longitudinal direction,
        between first and second outer surfaces in a lateral direction that is perpendicular to the longitudinal direction, and
        between first and second side surfaces in a transverse direction that is perpendicular to the longitudinal direction and perpendicular to the lateral direction;
    wherein the body has a bolt-hole extending into the first outer surface in the lateral direction, the bolt-hole for receiving and engaging with the bolt;
    wherein the first and second outer surfaces each have a face for engaging with the base part when the device is inserted in an aperture in the base part, at least one of the faces on the first and second outer surfaces being angled with respect to the longitudinal direction to thereby engage with the base part and orient the device with resect to the base part so that the bolt-hole aligns with a through-hole in the base part; and
    wherein the face on the first outer surface comprises an outwardly protruding step that extends at an angle to the face on the second outer surface.

12. The device according to claim 11, wherein the step extends in the transverse direction.

13. The device according to claim 12, wherein the first outer surface further comprises a planar surface located below the step and extending in the longitudinal direction.

14. A connector device for connecting an element to a base part via a bolt, the device comprising:
    a body extending
        between first and second ends in a longitudinal direction,
        between first and second outer surfaces in a lateral direction that is perpendicular to the longitudinal direction, and
        between first and second side surfaces in a transverse direction that is perpendicular to the longitudinal direction and perpendicular to the lateral direction;
    wherein the body has a bolt-hole extending into the first outer surface in the lateral direction, the bolt-hole for receiving and engaging with the bolt;
    wherein the first and second outer surfaces each have a face for engaging with the base part when the device is inserted in an aperture in the base part, at least one of the faces on the first and second outer surfaces being angled with respect to the longitudinal direction to thereby engage with the base part and orient the device with respect to the base part so that the bolt-hole aligns with a through-hole in the base part; and wherein the face on the second outer surface extends in the longitudinal direction.

15. The device according to claim 14, wherein the second outer surface further comprises a curved portion located below the face on the second outer surface with respect to the longitudinal direction.

16. The device according to claim 15, wherein second outer face further comprises a planar surface, wherein the curved portion is located between the planar surface on the second outer surface and the face on the second outer surface with respect to the longitudinal direction.

17. The device according to claim 16, wherein the curved portion uniformly transitions from the planar surface to the face on the second outer surface.

18. The device according to claim 16, wherein the planar surface is defined by a pair of ribs that are spaced apart in the transverse direction.

19. The device according to claim 18, comprising a recess between the ribs.

20. A connector device for connecting an element to a base part via a bolt, the device comprising:

a body extending between first and second ends in a longitudinal direction, between first and second outer surfaces in a lateral direction that is perpendicular to the longitudinal direction, and between first and second side surfaces in a transverse direction that is perpendicular to the longitudinal direction and perpendicular to the lateral direction;

wherein the body has a bolt-hole extending into the first outer surface in the lateral direction, the bolt-hole for receiving and engaging with the bolt;

wherein the first and second outer surfaces each have a face for engaging with the base part when the device is inserted in an aperture in the base part, at least one of the faces on the first and second outer surfaces being angled with respect to the longitudinal direction to thereby engage with the base part and orient the device with respect to the base part so that the bolt-hole aligns with a through-hole in the base part; and wherein the second end of the body has a curved outer surface that merges with the first outer surface.

21. The device according to claim 20, wherein the second end of the body has an angled edge that merges with the second outer surface.

22. A connector device for connecting an element to a base part via a bolt, the device comprising:

a body extending between first and second ends in a longitudinal direction, between first and second outer surfaces in a lateral direction that is perpendicular to the longitudinal direction, and between first and second side surfaces in a transverse direction that is perpendicular to the longitudinal direction and perpendicular to the lateral direction;

wherein the body has a bolt-hole extending into the first outer surface in the lateral direction, the bolt-hole for receiving and engaging with the bolt;

wherein the first and second outer surfaces each have a face for engaging with the base part when the device is inserted in an aperture in the base part, at least one of the faces on the first and second outer surfaces being angled with respect to the longitudinal direction to thereby engage with the base part and orient the device with respect to the base part so that the bolt-hole aligns with a through-hole in the base part; and wherein the first end of the body is radially curved in the lateral direction.

23. A connector assembly comprising:

a device;

a bolt;

a base part that defines a through-hole for receiving the bolt and also defines an aperture for receiving the device; and the device comprising:

a body extending between first and second ends extending in a longitudinal direction, between first and second outer surfaces in a lateral direction that is perpendicular to the longitudinal direction, and between first and second side surfaces in a transverse direction that is perpendicular to the longitudinal direction and perpendicular to the transverse direction;

wherein the body has a bolt-hole extending into the first outer surface in the lateral direction, the bolt-hole for receiving and engaging with the bolt; and wherein the first and second outer surfaces each have a face for engaging with the base part when the device is inserted in an aperture in the base part, at least one of the faces on the first and second outer surfaces being angled with respect to the lateral and longitudinal directions to thereby engage with the base part and orient the device with respect to the base part so that the bolt-hole aligns with a through-hole in the base part.

* * * * *